June 24, 1930.    C. T. PFLUEGER    1,766,532
FISHING TACKLE
Filed Aug. 6, 1927

INVENTOR.
CHARLES T. PFLUEGER.
BY Ely t Barrow
ATTORNEYS.

Patented June 24, 1930

1,766,532

UNITED STATES PATENT OFFICE

CHARLES T. PFLUEGER, OF AKRON, OHIO, ASSIGNOR TO THE ENTERPRISE MANUFACTURING COMPANY, OF AKRON, OHIO, A CORPORATION OF OHIO

FISHING TACKLE

Application filed August 6, 1927. Serial No. 211,164.

This invention relates to improvements in fishing tackle, the invention being shown as applied to sinkers, although it may be used with other bodies used in fishing. The particular object of the invention is to improve upon former construction of this type in securing greater flexibility and freedom of movement of the line or tackle attached to the sinkers or other bodies.

The advantages of the present improvement will be apparent to those familiar with this art. Two preferred types of devices are shown herein, both of which embody the invention, one form being of the integral type and the other of the separable type in which the sinker may be separated to permit the attachment of hooks or other parts of the fishing tackle.

Figure 1:
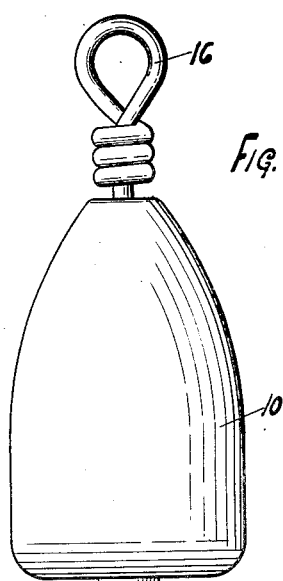
Figure 1 is a side view of the improved type of sinker.
Figure 2:
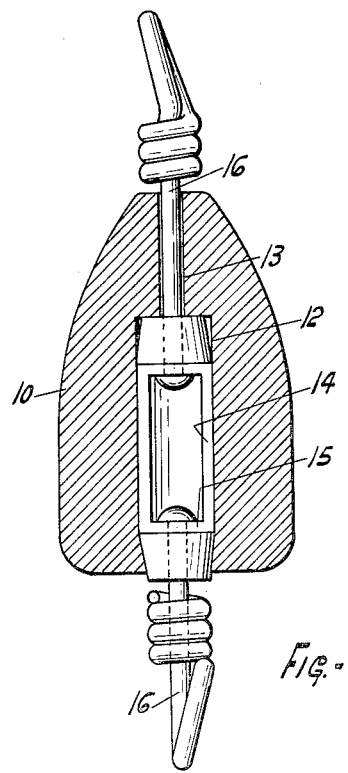
Figure 2 is a longitudinal section through the device.

In the drawings, 10 represents the body of the sinker which is formed interiorly with an enlarged chamber 12 having a reduced passage 13 leading therefrom to the top of the sinker. In the chamber 12 is located the swivel body 14 which is of the usual barrel or box type having a central member 15 in which are swiveled the upper and lower links 16 to which the line or tackle is attached, the upper link being loosely received within the passage 13. The lower end of the swivel is retained within the sinker by peening the metal over the barrel.

Figure 3:
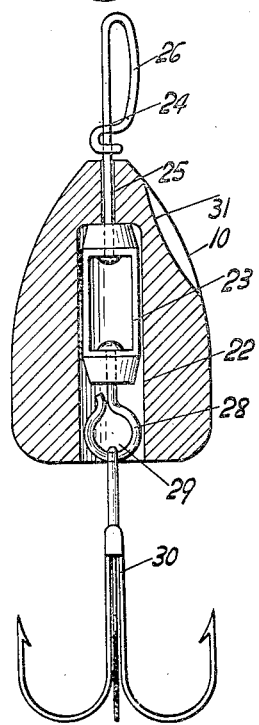
Figure 3 is a similar view through the modified or separable form.

In the form shown in Figure 3, the body of the sinker is provided with a somewhat deeper chamber 22 in which is removably seated the swivel 23. The upper link 24 is loosely received in the passage 25 and is formed with a return bent portion 26 which is passed about the main stem of the link and thus provides a detachable means for holding the swivel in the chamber. The lower link 28 is provided with an eye 29 for the attachment of a hook 30, or some other form of tackle. Having the eye 29 retained within the chamber 22 prevents the hook 30 from becoming unfastened. The body may be provided with a groove 31 for facilitating the disassembling of the parts, providing a channel for the loop 26.

By the device as shown, the line is made more flexible than in previous forms of devices of this type because of the reason that not only is the body member free to revolve upon the line, but the line upon both sides thereof is independently rotatable. This reduces the tendency to twist and tangle and makes a more efficient mounting for the sinker.

What is claimed is:

1. A sinker for fishing lines, comprising a sinker body, a chamber within the body, a yoke located within the chamber, and swivel links carried by the yoke and projecting at opposite ends of the sinker body.

2. A sinker for fishing lines, comprising a sinker body, a chamber within the body, a yoke permanently secured in the chamber, and swivel links carried by the yoke and projecting at opposite ends of the sinker body.

3. An article of fishing tackle, comprising a body member, a swivel body secured within the body member, and means swiveled on both ends of the swivel body to which tackle may be attached.

4. A sinker for fishing lines comprising a sinker body having an enlarged chamber located on the axis of the body and open at one end of the body, said chamber terminating within the body, said body having a reduced passageway from the chamber to the other end of the body, a swivel body located within the chamber, a link located within the passageway, said link being rotatively connected at its inner end to the swivel body, and a second link rotatively connected to the swivel body at the other end thereof, said sinker body being free to rotate on the first named link.

CHARLES T. PFLUEGER.